(12) United States Patent
Hojjat

(10) Patent No.: US 12,374,781 B2
(45) Date of Patent: Jul. 29, 2025

(54) MIMO ANTENNA WITH INTEROPERATING THREE COLUMN ARRANGEMENT OF ELEMENTS

(71) Applicant: Communication Components Antenna Inc., Kanata (CA)

(72) Inventor: Nasrin Hojjat, Ottawa (CA)

(73) Assignee: Communication Components Antenna Inc., Kanata (CA)

(*) Notice: Subject to any disclaimer, the term of this patent is extended or adjusted under 35 U.S.C. 154(b) by 478 days.

(21) Appl. No.: 17/858,454

(22) Filed: Jul. 6, 2022

(65) Prior Publication Data

US 2024/0014574 A1   Jan. 11, 2024

(51) Int. Cl.

| | |
|---|---|
| *H01Q 1/24* | (2006.01) |
| *H01Q 5/42* | (2015.01) |
| *H01Q 5/48* | (2015.01) |
| *H01Q 19/10* | (2006.01) |
| *H01Q 21/06* | (2006.01) |
| *H01Q 21/26* | (2006.01) |
| *H01Q 21/28* | (2006.01) |
| *H04B 7/0413* | (2017.01) |

(52) U.S. Cl.
CPC .............. *H01Q 1/246* (2013.01); *H01Q 5/42* (2015.01); *H01Q 5/48* (2015.01); *H01Q 19/108* (2013.01); *H01Q 21/062* (2013.01); *H01Q 21/26* (2013.01); *H01Q 21/28* (2013.01); *H04B 7/0413* (2013.01)

(58) Field of Classification Search
CPC ............ H01Q 1/246; H01Q 5/42; H01Q 5/48; H01Q 19/108; H01Q 21/062; H01Q 21/26; H01Q 21/28; H01Q 25/001; H04B 7/0413

See application file for complete search history.

(56) References Cited

U.S. PATENT DOCUMENTS

2014/0375502 A1* 12/2014  Foo ................. H01Q 15/14
                                                                343/893
2024/0347911 A1* 10/2024  Al .................... H01Q 21/24

* cited by examiner

*Primary Examiner* — Robert Karacsony
(74) *Attorney, Agent, or Firm* — Sofer & Haroun, LLP

(57) ABSTRACT

A cellular base station antenna is provided with a plurality of radiating elements arranged among a plurality of columns disposed over a reflector. In accordance with one embodiment, the first array of antenna elements and second array of antenna elements are arranged across three vertically arranged columns. At least a first array of antenna elements includes at least some of said plurality of radiating elements on each one of the columns operating together to produce a first antenna beam. At least a second array of antenna elements includes at least some other of the plurality of radiating elements on each one of the columns so as to operate together to produce a second antenna beam. As such, each of the three vertically arranged columns include at least some elements from both the first array and the second array.

15 Claims, 14 Drawing Sheets

(ELEVATION - A1)

(AZIMUTH - A1)

(ELEVATION - A2)

(AZIMUTH - A2)

(ELEVATION - A1+A2)

(AZIMUTH - A1+A2)

(ELEVATION OF PRIOR ART STACKED
ARRANGEMENT (TWO THREE-FOOT STACKED))

MIMO ANTENNA WITH INTEROPERATING THREE COLUMN ARRANGEMENT OF ELEMENTS

FIELD OF THE INVENTION

This application relates to cellular base station antennas. More particularly, the present application relates to a cellular base station antenna with reduced dimensions, without trading off performance.

DESCRIPTION OF RELATED ART

In the field of cellular base station antennas, as a general proposition there is an overriding desire to make the antenna as small as possible, due to limited space on cellular towers and other mounting locations. However, as the antenna/radome is made ever smaller, it limits the amount of space within which to mount the radiating elements on a reflector/board. For example, typically it is desirable to have the antenna reflector to be of a length of six (6) feet or less, and less than 540 mm in width to fit within a typical radome. Because of the increased number of antenna arrays required for MIMO (Multiple Input Multiple Output) applications and with narrower azimuth beamwidths required for reducing interference such as 45° instead of 65°, achieving smaller size arrays for base stations is becoming ever more important.

The space challenge posed by MIMO requirements is further exacerbated with the ever-increasing signal capacity requirements of base station antennas, which demand a countervailing desire to include more elements or arrange the spacing to improve signal quality and capacity, usually requiring more space. This sets up a fundamental problem in the cellular base station industry when trying to meet both limited space requirements and enhanced signal quality requirements.

For example, a common style antenna used in the prior art is a 4×4 MIMO antenna (Multiple Input Multiple Output two dual-polarization antenna) with 45° azimuth beamwidth for low band frequency bands of 614-896 MHz. MIMO (Multiple Input Multiple Output) refers to multiple antennas, which can be elements or arrays, used at the source and the destination, to send and receive more data, increase the performance, data speeds, and transmission data capacity by providing signal transmission through multiple paths simultaneously.

In order to have two independent dual polarized arrays each with 45° azimuth beamwidth, for example employing a 4*4 MIMO with 45° azimuth beamwidth, in one single enclosure of six (6) feet, there is a first prior art solution, to provide two shorter three-foot arrays stacked on top of one another. The problem with such an array is that the elevation beamwidth ends up being twice that from a standard single six-foot length array resulting in a lower gain. As such stacking two short antennas cannot provide the desired added performance.

Furthermore, the gain of an antenna array increased by increasing the number of elements due to the same phase addition of radiated signal of all the elements in the desired direction and reducing radiation in unwanted directions. This means that stacking two full length arrays, using for example two stacked six (6) foot arrays for a total twelve (12) feet in height might theoretically work, but it is almost certainly not feasible in most situations due to height/length restrictions.

For example, FIG. 1 shows a typical prior art example having two stacked three-foot arrays with the same width, in order to meet the signal requirements for a 4×4 MIMO antenna (Multiple Input Multiple Output two dual-polarization antenna) with 45° azimuth beamwidth for low band frequency bands of 614-896 MHz. As illustrated in FIG. 1 there are two stacked 45° arrays A1 and A2 providing a signal with a wide elevation beam at low band frequency. Each array A1 and A2 has two columns of elements labeled as col. (1) and col. (2). It is noted that column 2 of the arrays A1 and A2 refer to the (LB) low band dipole elements with eight large dipole elements on each column. The other elements shown relate to presence of a different array on the same reflector such as an MB (Medium Band) array on the same reflector/antenna which is just a demonstration of a normal practical implementation as a base station antenna and is only shown for context.

However, as explained above, such an arrangement is not ideal because it yields a lower gain and wider elevation beamwidth due to lower number of elements per vertical column, for instance four (4) elements instead of eight (8) in a full-length array, for the present example. As noted above one way to theoretically fix this issue would be to stack two six-foot arrays which may be able to produce higher gain and narrower beamwidths, but as noted this would double the height of normal six-foot length to twelve feet, making it impossible to meet the maximum physical size limitation of the antenna, which is about nine feet, while many applications have even stricter height limitations. Even though it might be possible to deploy a 4×4 MIMO with a stacked arrangement with a nine feet height (two four and half height panels) for example in less restricted rural locations, still the shorter lengths of the two stacked arrays of only four and half feet, will still result in a wider elevation beamwidth and a lower gain compared to a full six (6) feet array as explained above.

Another approach to improve gain and provide narrow beam width would be to increase the width of the reflector to fit two 45° side by side arrays for a total width of reflector being about 739 mm. However, such a wide width array is also not acceptable for many implementations requiring a width of less than 550 mm.

As another example of prior art, as shown in FIG. 2, two five-foot arrays are arranged side by side. This arrangement is intended to meet the signal requirements of higher gain, and narrow elevation beamwidth (<20°) for a five-foot array for 4×4 MIMO antenna (dual-polarization antenna) with 45° azimuth beamwidth for low band frequency bands of 698-896 MHz. As shown in FIG. 2 there are two side-by-side 45° arrays A1 and A2 located on a widened or connected reflector panel(s), each array having two columns of five (5) dipole elements which results in an antenna with four vertical columns with a total of twenty (20) elements and thus a wide width. This design has better gain and narrow elevation beamwidth compared to FIG. 1 approach, but the physical issue with the wider footprint caused by the side-by-side arrangement is not acceptable in many network implementations. For example, such a prior art antenna in FIG. 2 may be as wide as 730 mm which is well over an ideal width of 540 mm for most space limited applications. It is noted that the other MB elements shown in FIG. 2 (on the left side) are just for context of a possible additional medium band antenna on the same reflector/antenna.

OBJECTS AND SUMMARY

The present invention overcomes the problems of the prior art relating to space limitations of the antennas, by providing a base station antenna architecture having three columns of elements onto a single reflector panel of an ordinary vertical length of six feet and an ordinary panel width of 540 mm or less. It is noted that although the present invention will be descried for example in the form of a six (6) foot height array the same inventive concepts may be implemented in other lengths including four (4), five (5), and eight (8) feet as well as other widths and column amounts depending on the needs of the designer/engineer.

Such an antenna and its three columns of elements enable the implementation of two separate and interoperating arrays of radiator elements with some elements in one column being associated with one array and other elements in the same column being associated with another array. As such the elements on the reflector panel for any one array interoperate with the elements of the other array as described in more detail below in the sense that they share column space unlike the prior art. With such an arrangement, a 4×4 MIMO antenna (two dual polarized arrays) for example having a 45° azimuth beamwidth for low band frequency bands of 614-896 MHz can fit within, for example, a 540 mm width, and both arrays would have six-foot vertical length without the need to use two side by side arrays. Similar implementations of the present invention may be made in widths other than 540 mm using the same concept.

Likewise, such an arrangement prevents the need to use the prior art two side by side six-foot arrays which is too wide to meet size constraints in many applications and it also prevents the need to use the prior art of two smaller three-foot stacked array which may not work for its intended purpose because of the resulting low gain and overly wide elevation beamwidth.

To this end a cellular base station antenna is provided with a plurality of radiating elements arranged among a plurality of columns disposed over a reflector. In accordance with one embodiment, the first array of antenna elements and second array of antenna elements are arranged across three vertically arranged columns. At least a first array of antenna elements includes at least some of said plurality of radiating elements on each one of the columns operating together to produce a first antenna beam. At least a second array of antenna elements includes at least some other of the plurality of radiating elements on each one of the columns so as to operate together to produce a second antenna beam. As such, each of the three vertically arranged columns include at least some elements from both the first array and the second array.

BRIEF DESCRIPTION OF THE DRAWINGS

The present invention can be best understood through the following description and accompanying drawings, wherein.

DETAILED DESCRIPTION

Figure 3A:
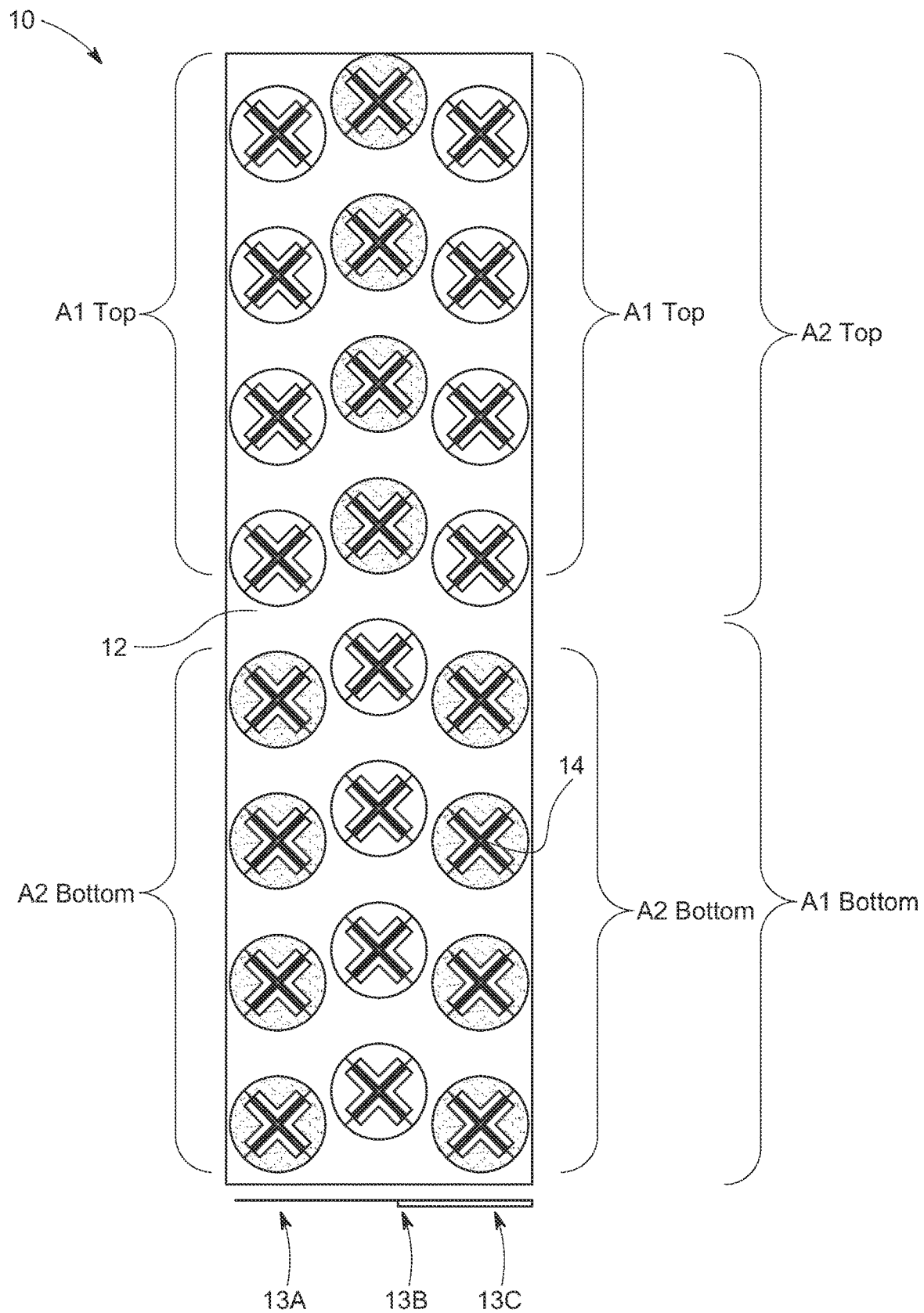
FIG. 3A is a diagram of a locked array architecture MIMO antenna in accordance with one embodiment.

The present arrangement as shown in a first exemplary FIG. 3A includes an antenna 10 having a reflector 12 and three columns 13A, 13B, 13C of antenna elements 14. In the present example, antenna elements 14 are shown as dipole antenna elements but the same concepts described herein may be used with other types of radiating elements such as patch elements. As shown in FIG. 3A, antenna 10 with the three-column architecture is shown supporting two 45° arrays A1 and A2 that operate together and both occupying the whole height of the array. An array of elements 14, such as Arrays A1 and A2, refers to a collection of elements 14 that operate together with a set of azimuth and elevation splitters and phase shifters and then connected to the input/output signal ports of antenna for producing a combined emission pattern. As shown in FIG. 3A, in each of columns 13A, 13B, and 13C, some of elements 14 are part of array A1, and others of elements 14 in the same column are part of array A2.

In this example, antenna 10 is a 4×4 MIMO having an exemplary 45° azimuth beamwidth for low band frequency bands of 614-896 MHz and is dimensioned in width such that reflector 12 can fit within a 535 mm wide radome (not shown) and is of a typical vertical length of six feet. It is noted that the present arrangement of an interoperating array architecture is described in connection with LB applications, but similar arrangements may be implemented in the context of MB, HB, or other types of cellular base station arrays. Such interoperating array architecture may be referred to as "interlocked" since the two arrays A1 and A2 appear interlocked with one another sharing portions of each vertical column. Each of the arrays A1 and A2 are configured to support the function of antenna 10 as a 4T4R ((Four Transmit Four Receive) 4*4MIMO). Each array A1 and A2 has two polarization modes (i.e. +/−45°) and antenna 10 may have four (4) supporting signal ports (not shown) for transmitting and receiving the cellular MIMO signals. It is noted that antenna 10 is described for an application requiring 535 mm wide or less, and a typical vertical length of six feet, producing two 45° arrays using only three columns instead of four that would have been required as explained in connection with FIGS. 1 and 2. However, it is understood that these are approximations and variations in these dimensions may be covered by the salient features of the present invention to accommodate standards changes in physical dimensions and/or signal requirements.

Turning to the specifics of the configuration of elements 14 of arrays A1 and A2, as shown in schematic FIG. 3A, each array A1 or A2 has two parts, a top part (A1 top and A2 top) and bottom part (A1 bottom and A2 bottom). In this Example for array A1, the portion referred to as A1 top is made of the four upper elements 14 located on outer columns 13A and 13C. This means that Array A1 has eight connected elements 14 located at the top of antenna 10. To complete array A1, A1 bottom is made up of the bottom four elements 14 located at the bottom half of middle column 13B. Thus, array A1 has twelve elements 14, eight located at the top and outer columns of antenna 10 (four in column 13A and four in column 13C) and the remaining four elements 14 are located at the bottom center of antenna 10 in column 13B. For array A2, the arrangement is reversed such that A2 (top) includes four elements in top middle column 13B and A2 bottom includes eight elements located four each in outer columns 13A and 13C. As such, each array A1 and A2 are made of twelve (12) antenna elements 14, with four (4) located in each one of columns 13A-13C in an interoperating manner.

In one example, antenna 10 may be configured with to provide a signal pattern that has 45° beamwidth. In one exemplary use of arrays A1 and A2 and the elements 14, the 45° beamwidth signal pattern is generated by the superposition of a wide beam and a narrow beam produced by the two different parts of each array. For example, for array A1 a first beam can be generated as a wider beam by radiation from bottom part of the array which consists of the four elements 14 in the bottom half of column 13B. A narrower angled second beam to be combined with the first wider beam to form the desired combined antenna signal pattern with 45° beamwidth is produced from the top part of arrays A1 by radiation from top four elements 14 in outer columns 13A and 13C. Because elements 14 in columns 13A and 13C are separated from each other by 370 mm when activated together by an azimuth splitter they form a narrow azimuth beamwidth. Similar explanation is applicable for array A2, but this time top part produces wide beam and bottom part produces the narrow beam and they superimpose in space to produce the 45° beam.

Figure 3B:
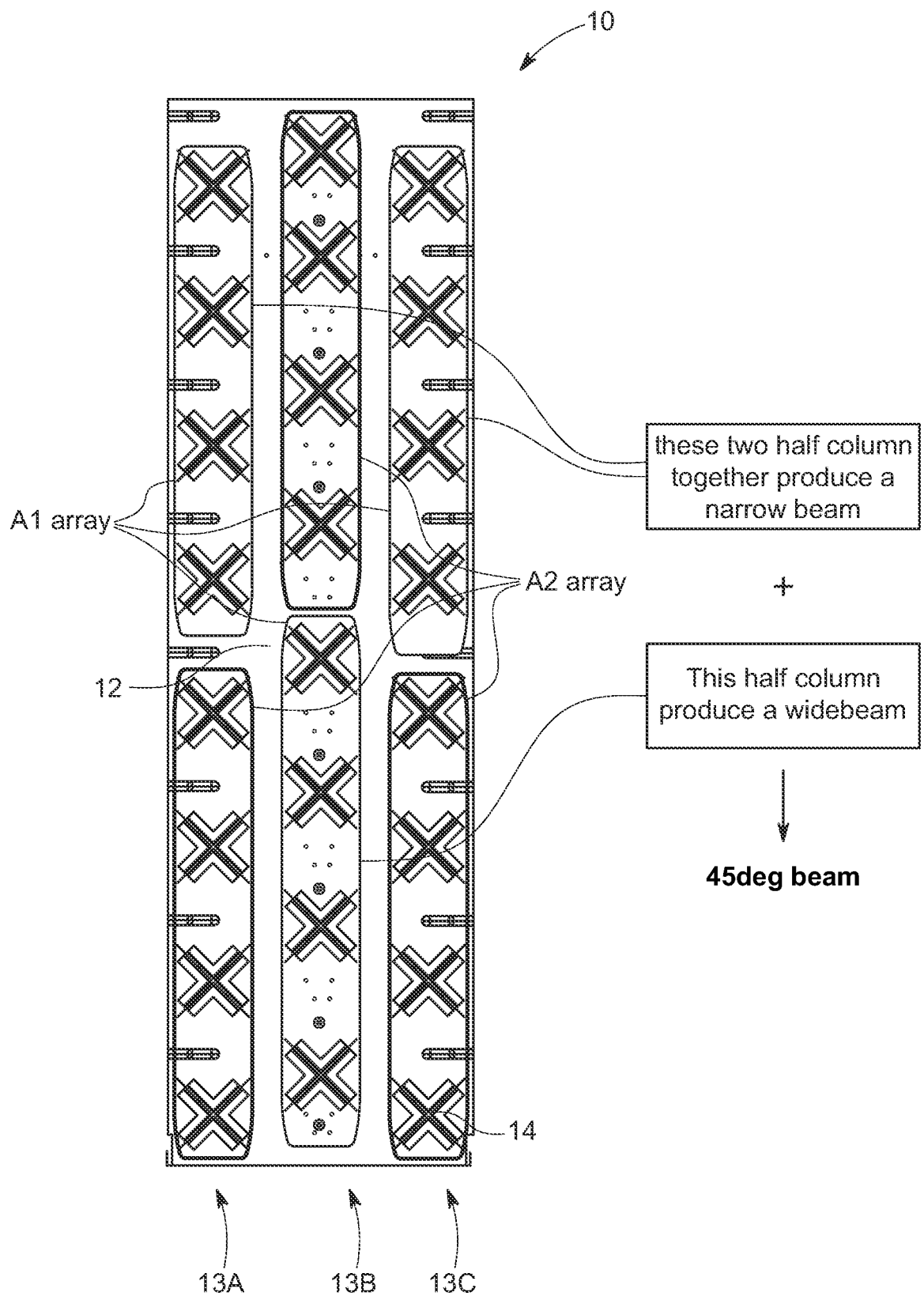
FIG. 3B is an annotated diagram of a locked array architecture MIMO antenna of FIG. 3A in accordance with one embodiment.

The configuration of the present exemplary embodiment is shown in annotated image FIG. 3B which is the same as schematic FIG. 3A but with annotations regarding the spacing and beamforming discussed in the above paragraph. The antenna image of FIG. 3B shows marked array A1 and its twelve elements 14 located in columns 13A, 13B, and 13C. The other features shown in FIG. 3B such as the ports are described in more detail below with respect to FIGS. 4A-4C.

Providing a more detailed description of the beam produced by array A1, the top four elements 14 of column 13A as well as from column 13C both from array A1 together produce a narrow azimuth beamwidth which is about 30° (<45°). It is known that as one increases the distance between elements 14 (i.e. be separating into columns 13A and 13C) the beam width of the resulting signal becomes narrower. Traditionally, in the prior art the distance between adjoining columns is about 200 mm to 250 mm. In one embodiment in accordance with the present invention shown in FIG. 3B, the distance between column 13A and column 13C is 370 mm resulting in the antenna with a signal beamwidth of 30° The remaining four elements 14 from array A1 located at the bottom of center column 13B produce a wide beam of about 65° (>45°). The beam shaped in the actual airspace in front of antenna 10 by elements 14 of array A1 is a superposition of these narrow and wide beams which combine to be the desired 45° beam.

Array A2 works in the same way as array A1 but reversed top to bottom. For example, the bottom eight elements 14 of array A2 in columns 13A and 13C produce a narrow 30° beam, with the top four remaining elements of array A2 in column 13B producing a wide 65° beam, but together the resultant A2 beam is an improved 45° beamwidth.

Figure 1:
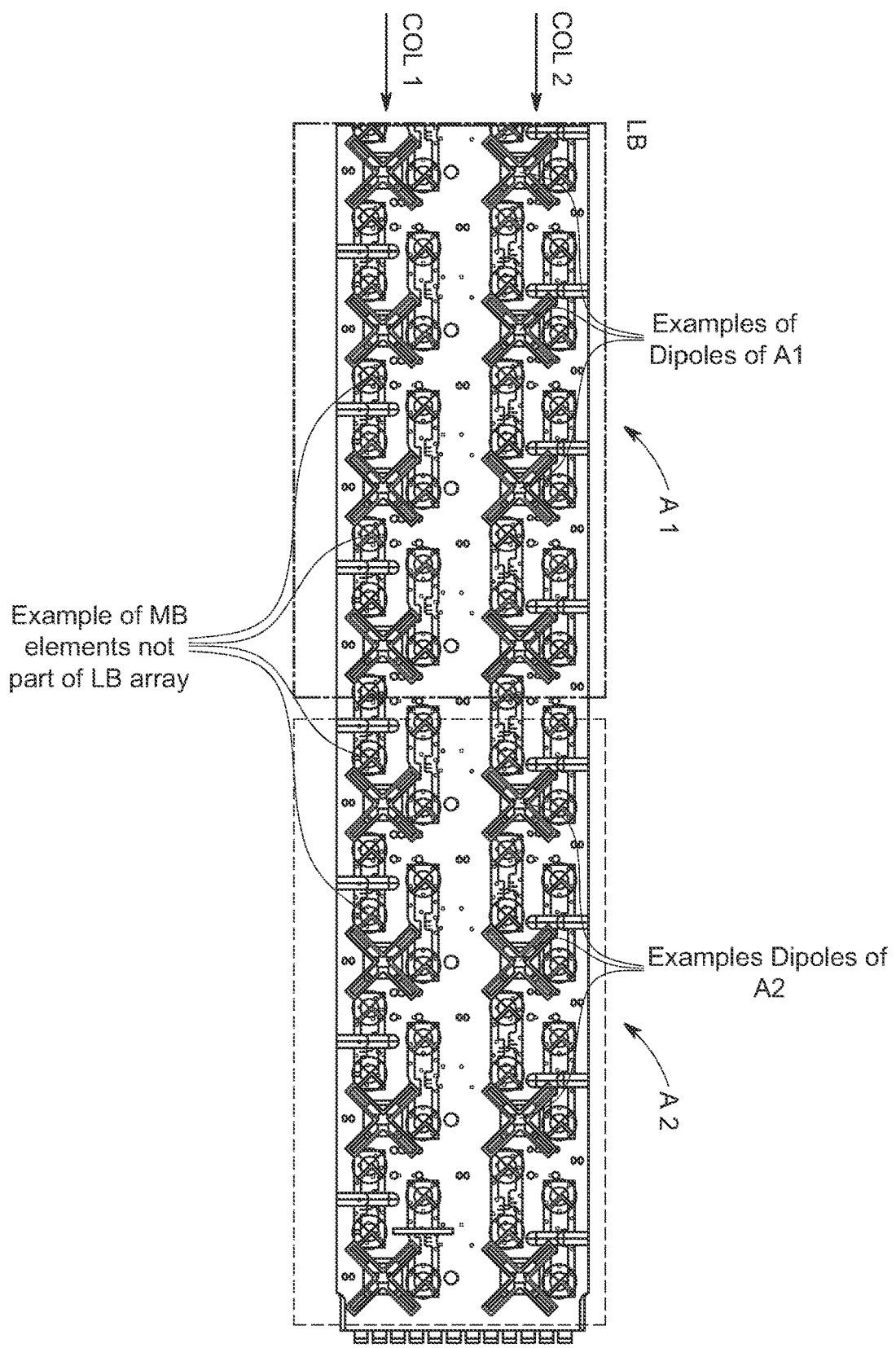
FIG. 1 is a prior art image of a MIMO antenna with two stacked arrays.
Figure 2:
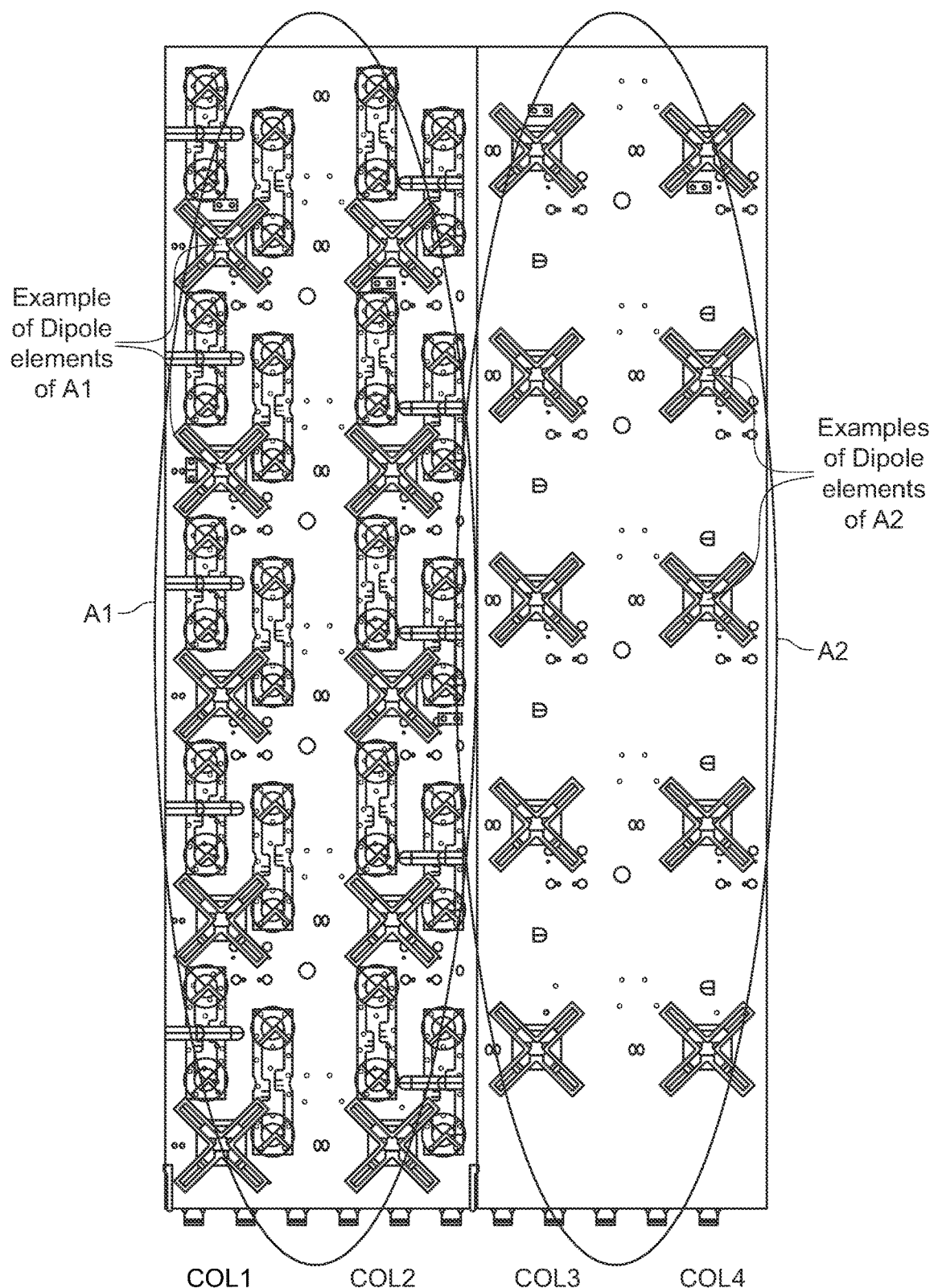
FIG. 2 is a prior art image of a MIMO antenna with two side-by-side arrays.

As a result of the combined beams of arrays A1 and A2, antenna 10 produces two full length 45° array with only three columns instead of four columns (as in prior art FIG. 2). In some instances, this can be done with a reduced width of <535 mm. Additionally, antenna 10 can produce a beam with high gain and narrow elevation beamwidth within the normal approximate six-foot standard length (unlike prior art FIG. 1). Regardless of such specific implementations of <535 mm in width and with six-foot of height, it is understood that other dimensions may be produced in larger or smaller formats, while still falling with in the scope of the inventive feature of producing two 45° beams with adequate gain, from two arrays using only three columns instead of four.

Figure 3C:
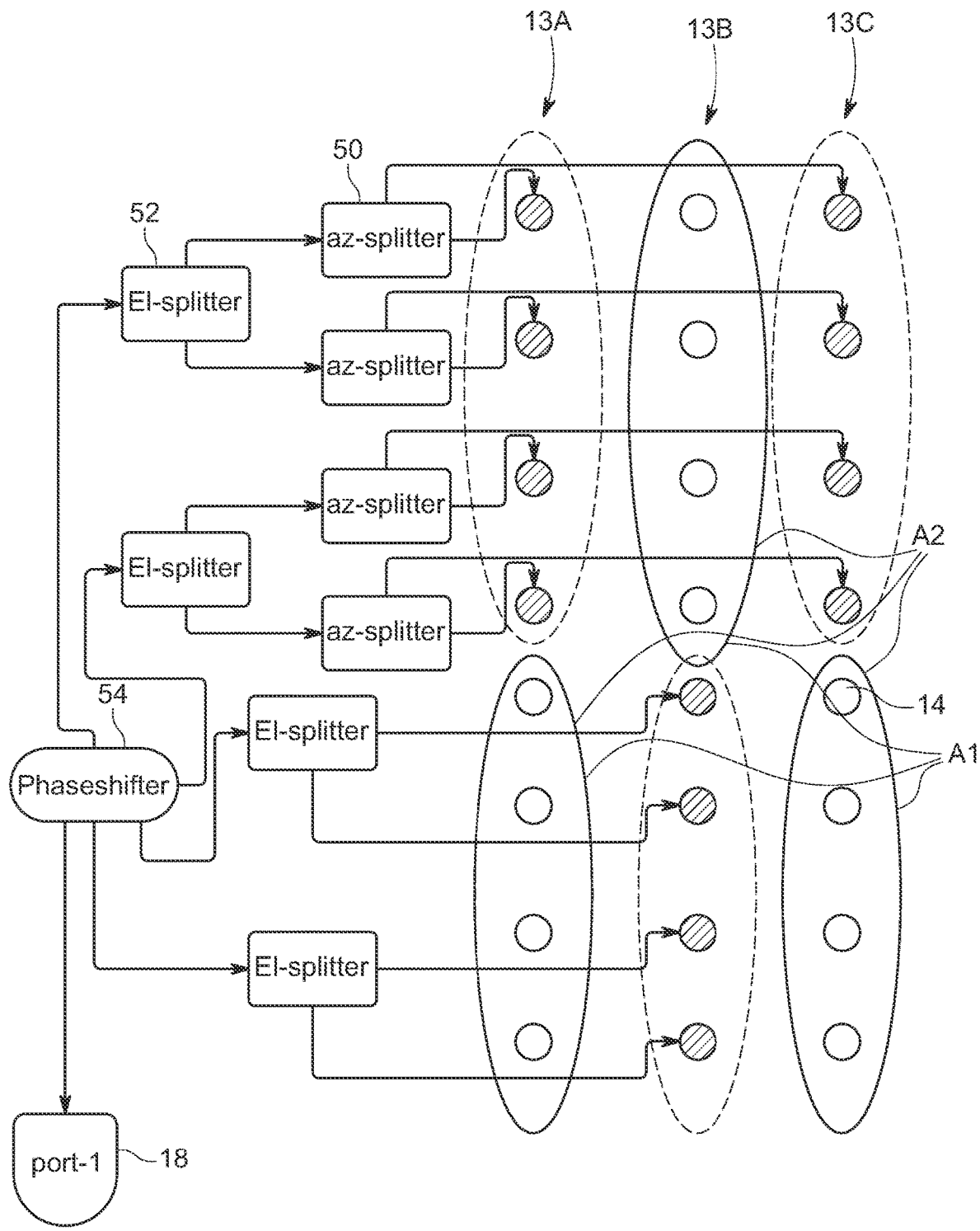
FIG. 3C is a schematic connection of elements from the antenna of FIGS. 3A and 3B to azimuth and elevation splitters, and to phase shifters and ports for one array, in accordance with one embodiment.

FIG. 3C shows an exemplary schematic connection of elements 14 to azimuth splitters 50, elevation splitters 52, as well as a phase shifter 54 and to an exemplary signal port 18 for array A1. As shown in FIG. 3C, two side elements 14 in columns 13A and 13C on top of array A1 for each row are combined with an azimuth splitter 50 to split power on such upper rows in the azimuth to generate the approximately 30° portion of the array A1 beam. For bottom four elements 14 of Array A1 in column 13B there is no azimuth splitter because there is only one element 14 per row. Additionally, as shown in FIG. 3C for every two horizontal rows elements 14 of Array A1 in all three columns 13A, 13B, and 13C are combined with an elevation splitter 52 to distribute the signal power from one connected port 18 across all of elements 14 in elevation. The input of a phase shifter 54 is connected to one antenna port 18 and the outputs are connected to the four elevation splitters 52. In a 4×4 MIMO arrangement, there are two ports 18 for Array A1 (one per polarization+45°/−45°). The same connection architecture but reverse is valid for A2 with two other ports 18. This provides the four ports 18 required for 4*4 MIMO application. It is noted that the AZ splitters (Azimuth) 50 and EL splitters (Elevation) 52 are both 3 dB splitters with one input and two outputs that are configured to divide the power equally between their two outputs. Phase of the outputs for AZ splitters 50 are the same in order that the beam is being shaped toward the boresight, while for EL splitters 52 there is a phase difference between the two outputs to provide the required phasing for tilt. Phase shifter 54 is a one to four splitter which is formed by a rotary arm wiper. By controlling the rotation of the wiper, along with constant phase of EL splitter 52, the antenna tilt can be changed from 2° to 12° tilt.

Figure 4A:
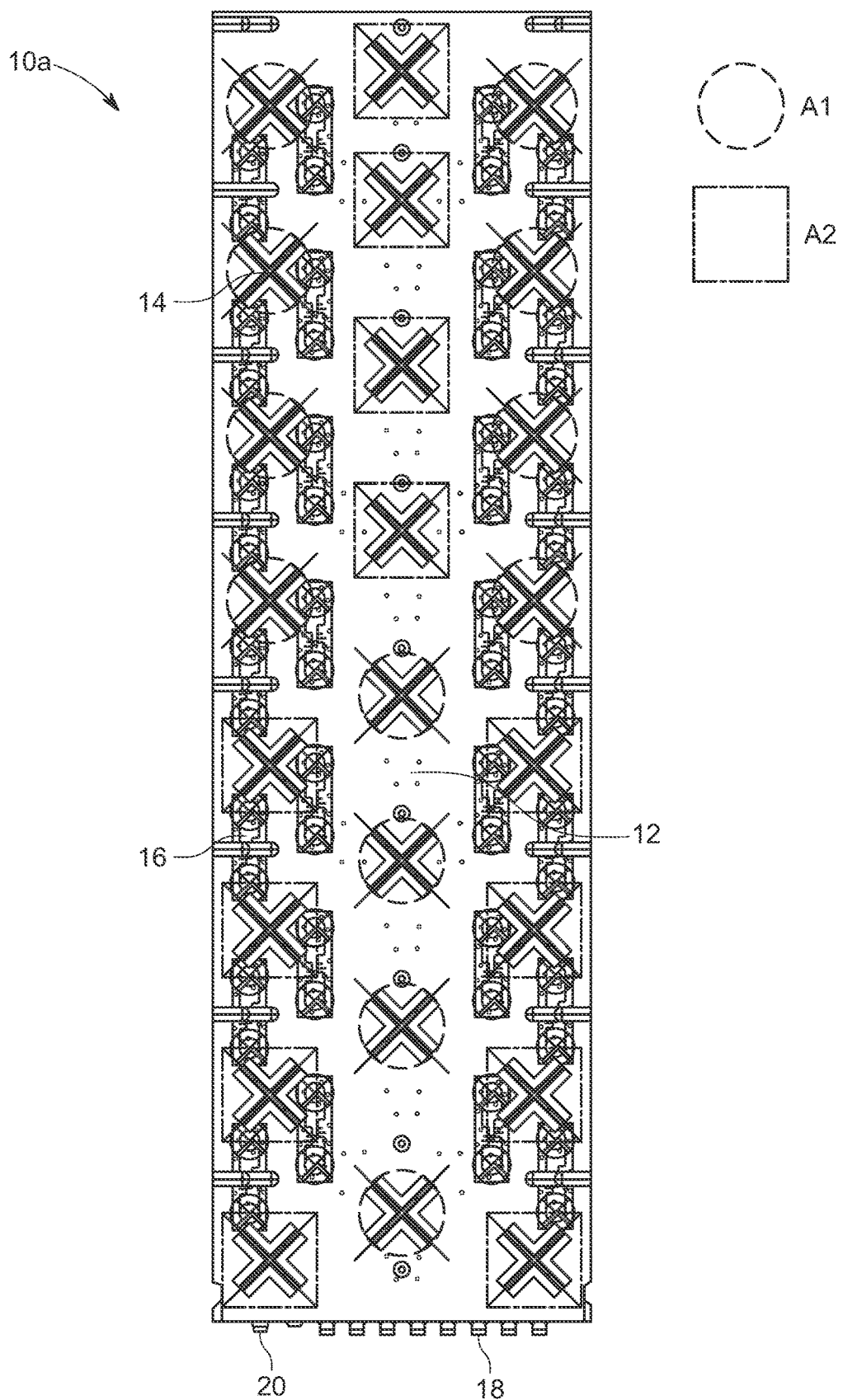
FIGS. 4A and 4B are images of the locked array architecture MIMO antenna in accordance with one embodiment.
Figure 4B:
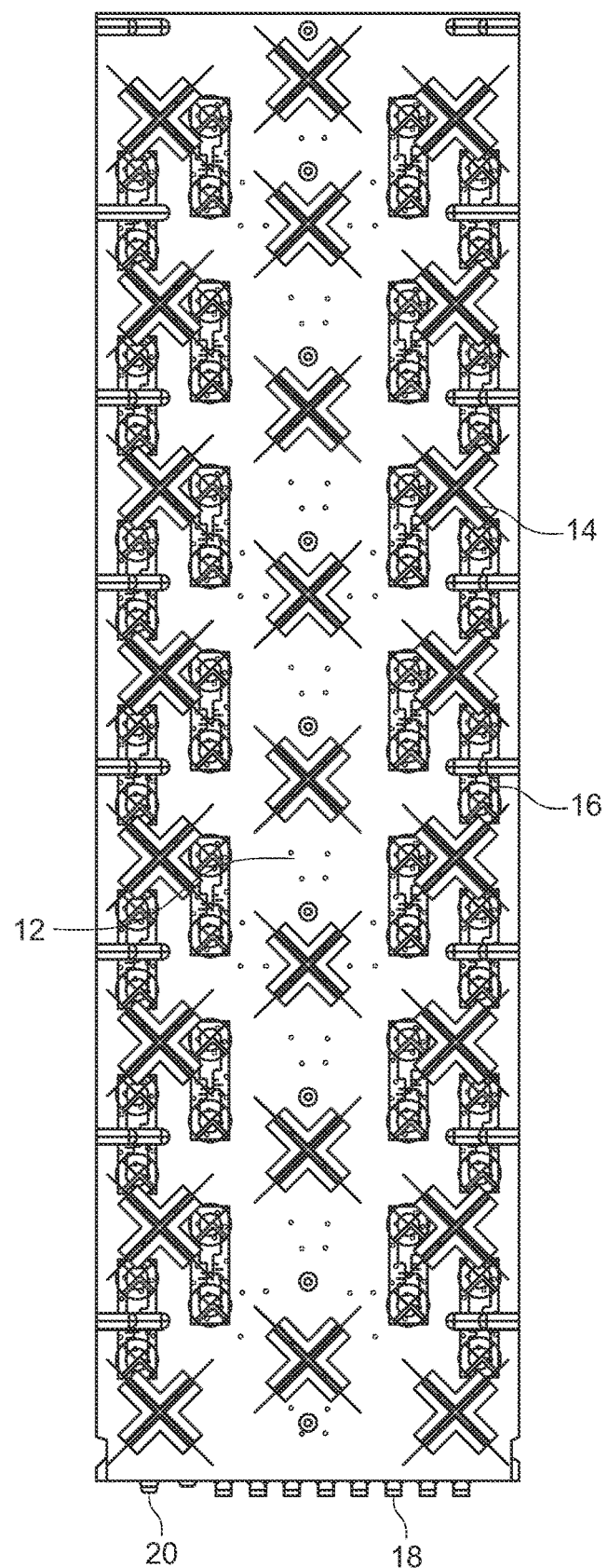

FIGS. 4A and 4B are images similar to FIG. 3B again illustrating the interoperating elements concept. FIGS. 4A and 4B are representative of the interlocked concept for making a specific 4×4 MIMO antenna 10a with a 45° azimuth beamwidth for low band frequency bands of 614-896 MHz. Here low band elements 14 on reflector 12 are accompanied by additional arrays of mid-band elements 16 of two arrays of 45° mid band frequency (1695-2400 MHZ) to produce an antenna 10a (8-port dual band antenna). This illustrates that the interoperating concept for arrays A1 and A2 for low band dipole elements 14 may often be implemented on an actual antenna 10a in conjunction with additional arrays of medium, or even high band frequencies all on the same reflector 12.

In this embodiment eight signal ports 18 are shown across the bottom of antenna 10a, and a single port 20 is for RET (Remote Electrical Tilt) control. Four ports of the eight ports 18 are from array A1 and A2 as outlined above, with the other four ports being for a possible other application like a separate mid band array on the same antenna 10 (see e.g. FIGS. 4A and 4B showing smaller exemplary mid-band elements 16 in the background behind the larger three columns of dipole elements 14 of Arrays A1 and A2).

FIG. 4B shows the image of antenna 10a, and FIG. 4A shows the same antenna 10a with markings on elements 14 to show arrays A1 and A2 for heightened visibility. Accordingly, elements 14 in on the top of columns 13A and 13C and the bottom of column 13B define array A1 and elements on the bottom of columns 13A and 13C and the top of column 13B define array A2.

Figure 4C:
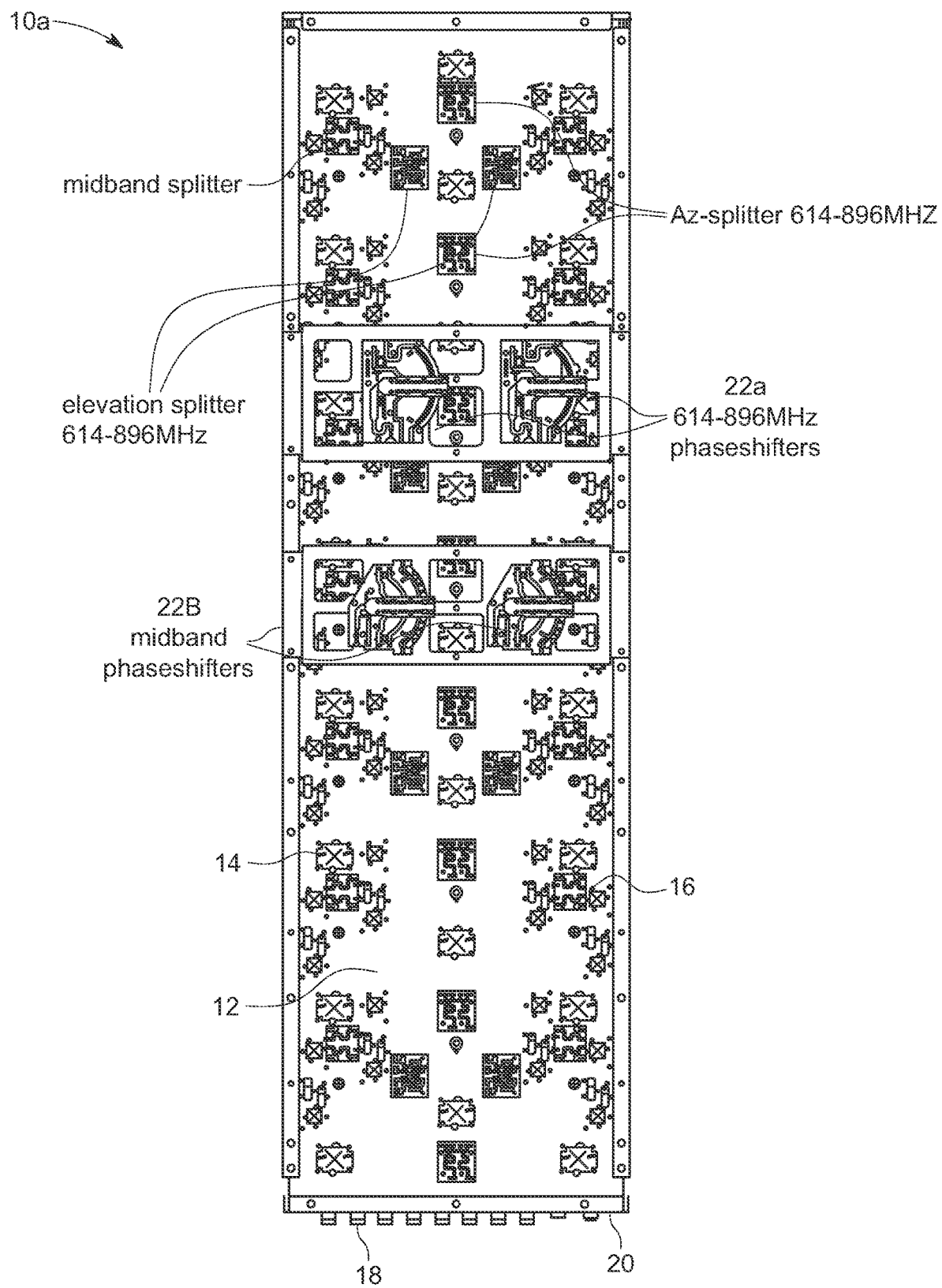
FIG. 4C is a back view image of the antenna of FIGS. 4A and 4B of the locked array architecture MIMO antenna in accordance with one embodiment.

FIG. 4C is a back view of antenna 10a illustrating phase shifters 22A and 22B. Here, phase shifters 22A are in two stacks, with a separately arranged two stacks of mid-band phase shifters 22B, both of which can be connected by cables to splitters on the back of reflector 12, which in turn are connected by cables to the feed boards for elements 14.

Although theoretically antenna 10 may be implemented solely with the interoperating low band elements 14 as shown in FIGS. 3A and 3B it is often the case, that such interoperating low band elements 14 shown in FIGS. 3A and 3B, illustrated in concept therein, may actually be used on antennas such as antenna 10a shown in FIGS. 4A-4C which include other band arrays including but not limited to MB, 3 GHz and 5 GHz bands, on the same reflector 12.

Figure 5B:
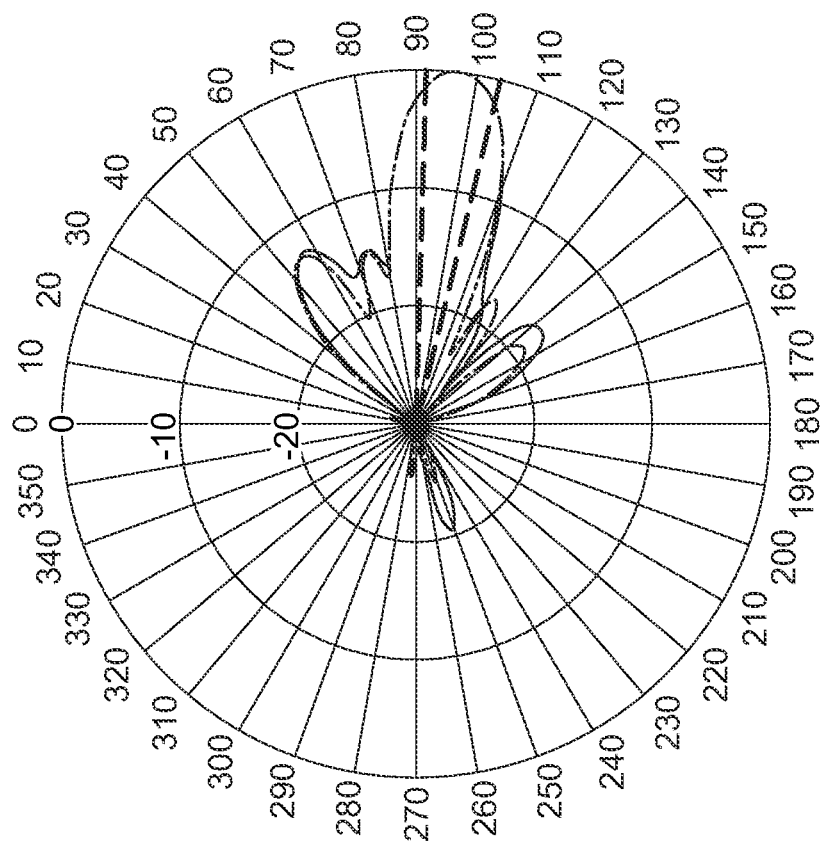
FIGS. 5A and 5B are azimuth and elevation patterns of array A1 of the locked array architecture MIMO antenna of FIGS. 4A and/or 4B, in accordance with one embodiment.
Figure 5A:
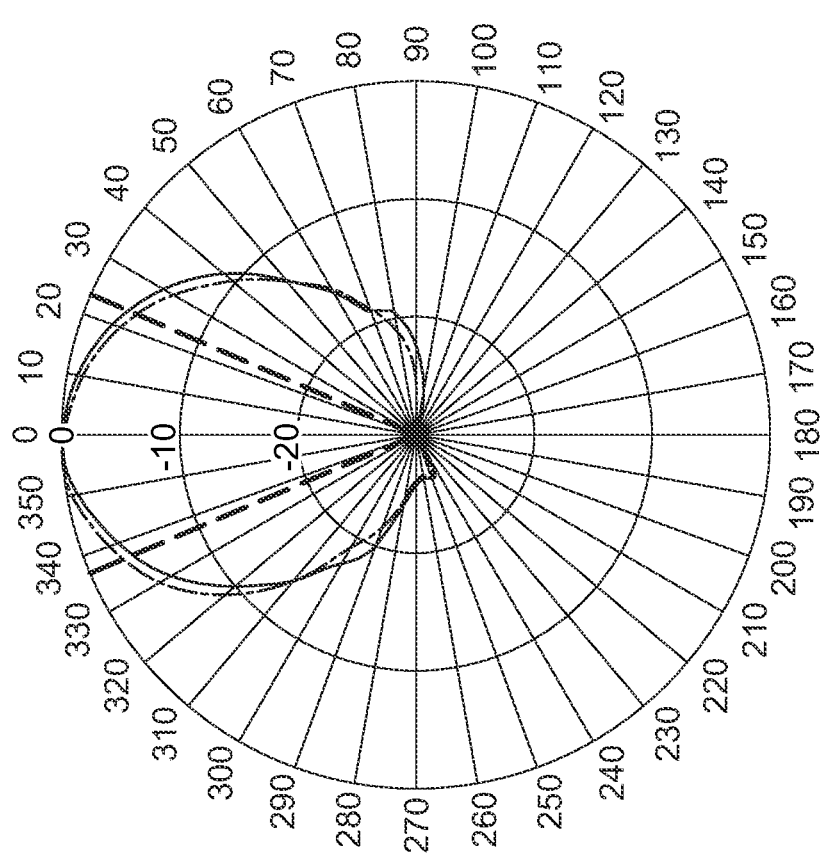

Turning to the function of the present antenna 10a according to the exemplary embodiments above, FIG. 5A shows an azimuth pattern of array A1 associated with first two low band ports 18 (ports #1 and #2 of four). FIG. 5B shows an elevation pattern of array A1 associated with the same two low band ports 18 (same ports #1 and #2 of four).

Figure 5D:
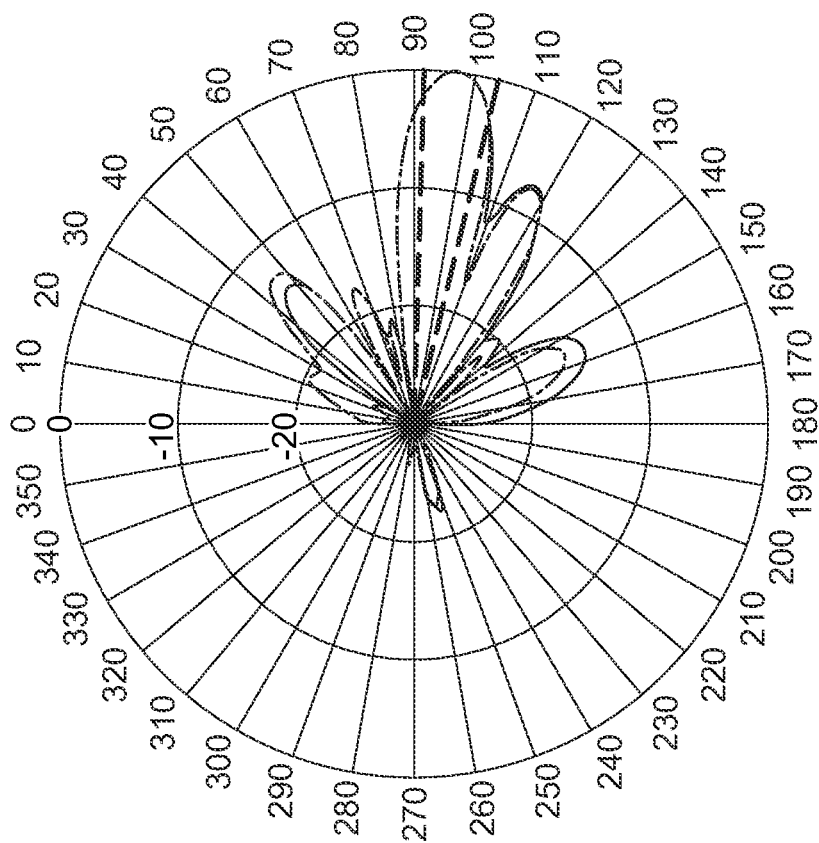
FIGS. 5C and 5D are azimuth and elevation patterns of array A2 of the locked array architecture MIMO antenna of FIGS. 4A and/or 4B, in accordance with one embodiment.
Figure 5C:
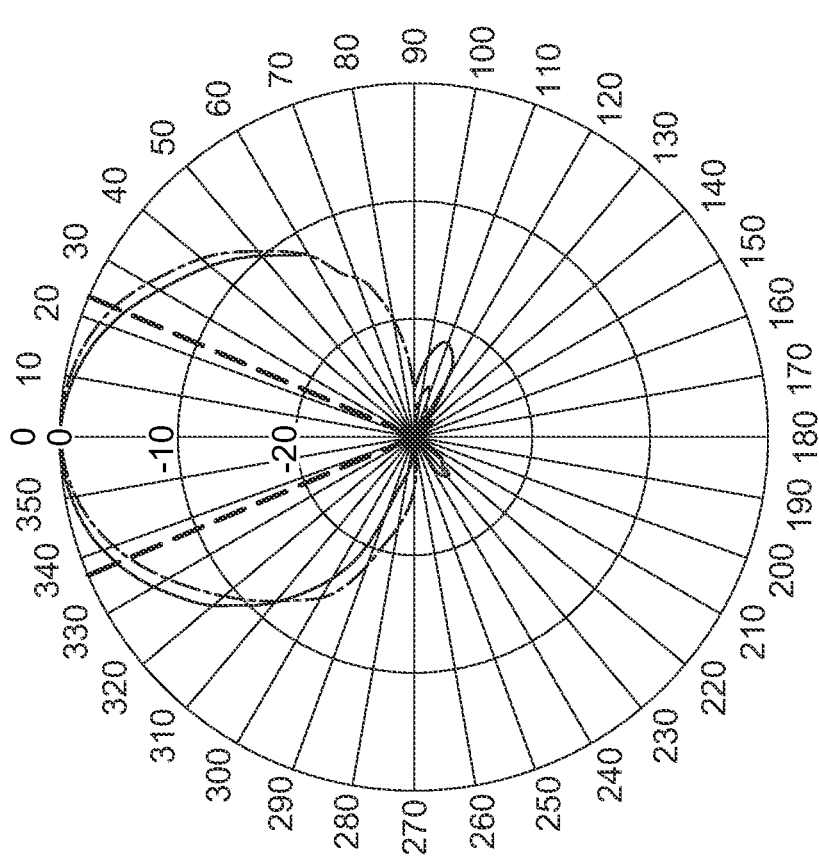
Figure 5F:
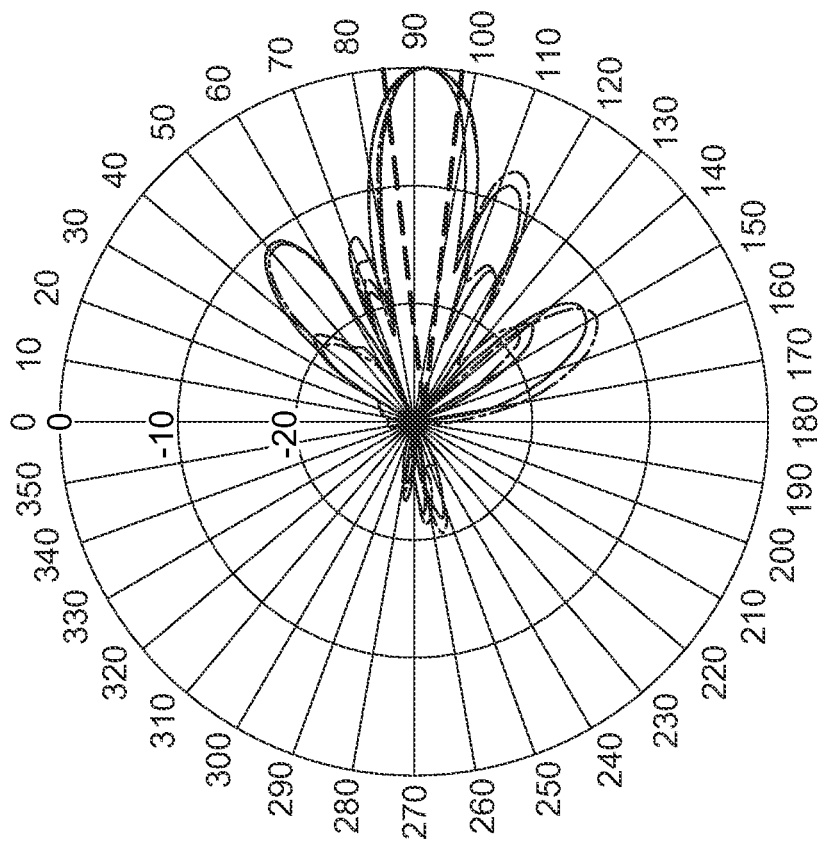
FIGS. 5E and 5F are combined azimuth and elevation patterns of arrays A1 and A2 of the locked array architecture MIMO antenna of FIGS. 4A and/or 4B in accordance with one embodiment.
Figure 5E:
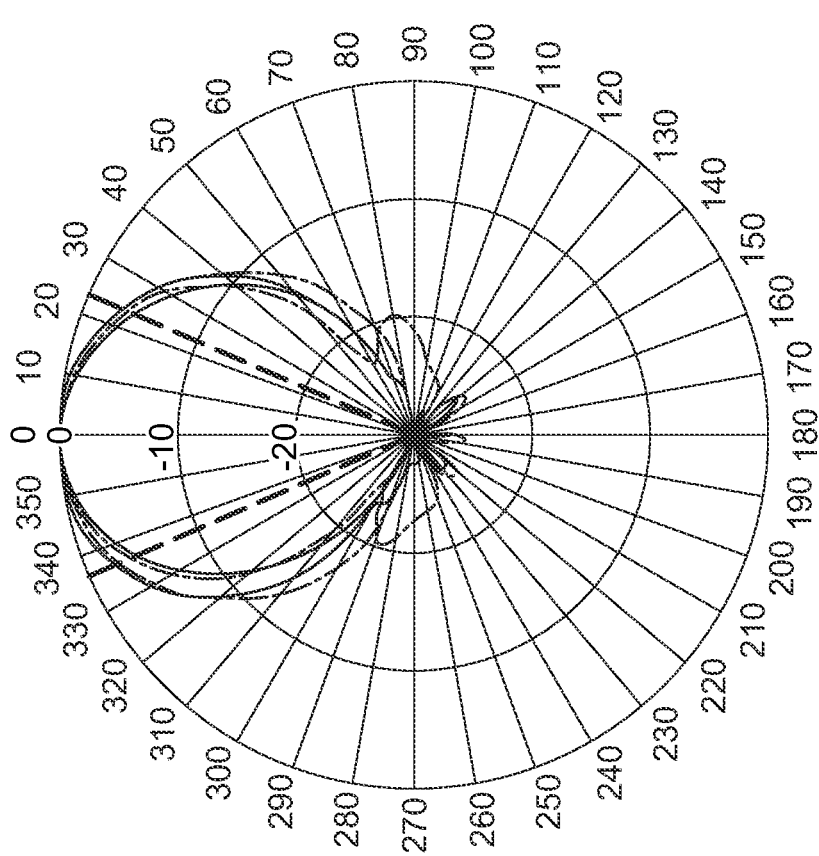

FIG. 5C shows an azimuth pattern of array A2 associated with second two low band ports 18 (ports #3 and #4 of four). FIG. 5D shows an elevation pattern of array A1 associated with the same two low band ports 18 (ports #3 and #4 of four). FIGS. 5E and 5F show the superimposed patterns of array A1 and A2.

Figure 5G:
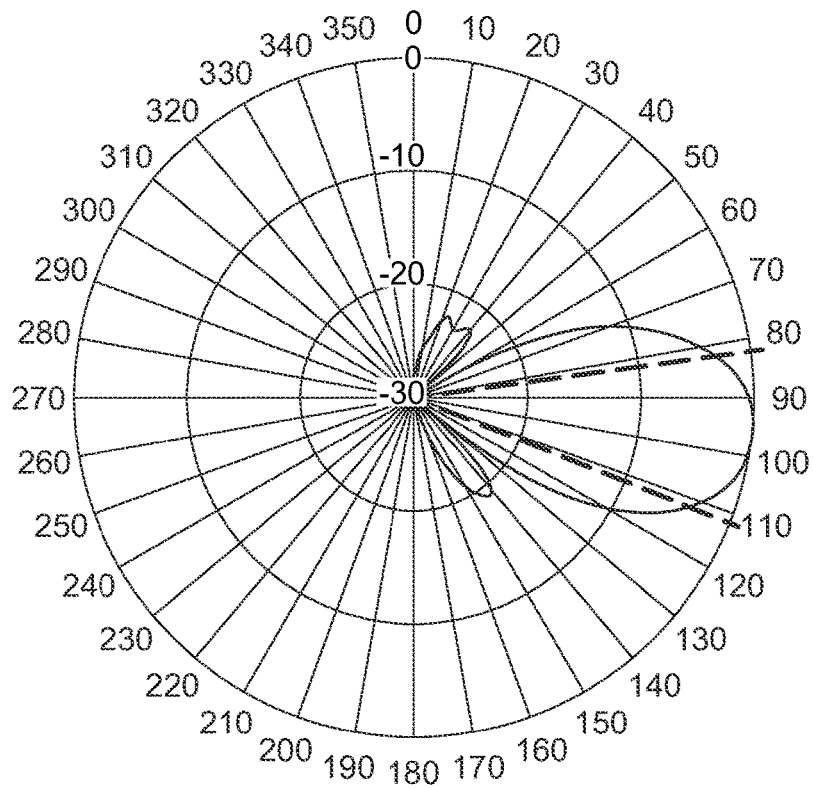
FIG. 5G is an elevation pattern of a prior art MIMO antenna with two stacked arrays (3-foot)

These FIGS. 5A-5F show 45° azimuth pattern with 14° elevation pattern achieved from these interoperating arrays A1 and A2 (see dotted guidelines on FIGS. 5A, 5C, and 5E). As shown in prior art FIG. 5G which is an elevation pattern produced by prior art antenna shown in FIG. 1, when there are stacked arrays using two half-height three-foot arrays, to meet the six-foot physical requirement, the elevation pattern is undesirably twice as wide as the elevation beam widths shown in FIGS. 5B, 5D, and 5F (e.g. half as wide as prior art).

Figure 6A:
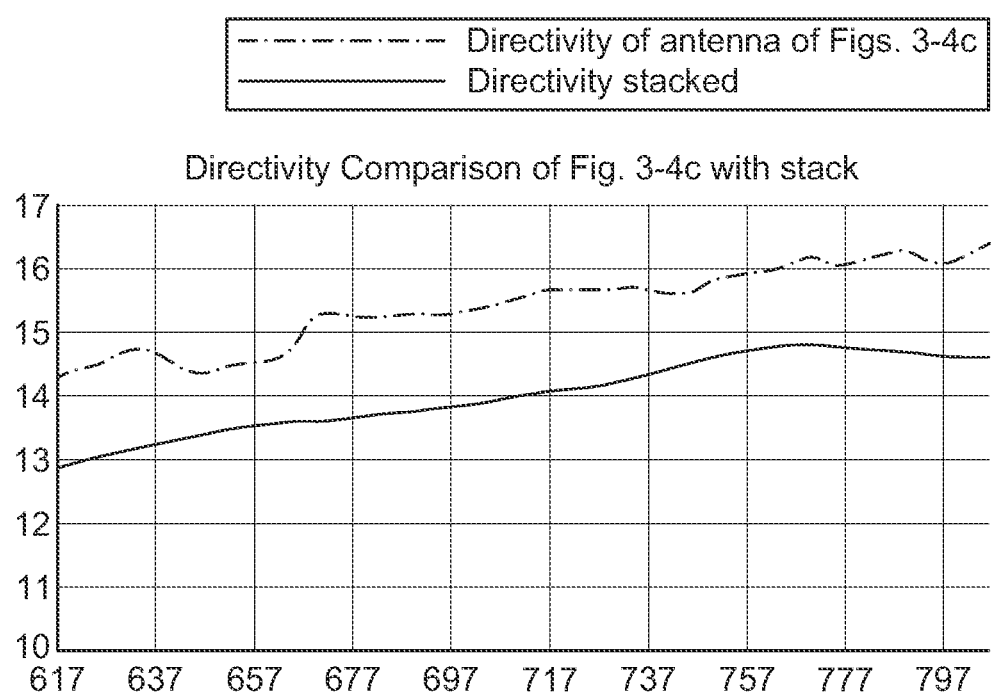
FIG. 6A shows a comparison of directivity between the antenna of FIGS. 3-4C compared to the prior art stacked arrangement of FIG. 1.

FIG. 6A shows a comparison of directivity between the antenna of FIGS. 3-4C compared to the prior art stacked arrangement of FIG. 1. The directivity of an antenna is a ratio of the radiation intensity in a given direction from the antenna to the radiation intensity averaged over all directions and is proportional to gain of antenna. FIG. 6A shows the comparison of beam directivity illustrating that the low band beam produced by antenna 10a achieves a directivity of about 1.2 to 1.5 dB more than the stacked arrangement of prior art FIG. 1. As such, FIG. 6A demonstrates that the arrangement of the present invention using the interoperating array architecture is at least more than 1 dB (higher gain) than stacked architecture of two ordinary two-column, three-foot arrays of prior art FIG. 1.

Figure 6B:
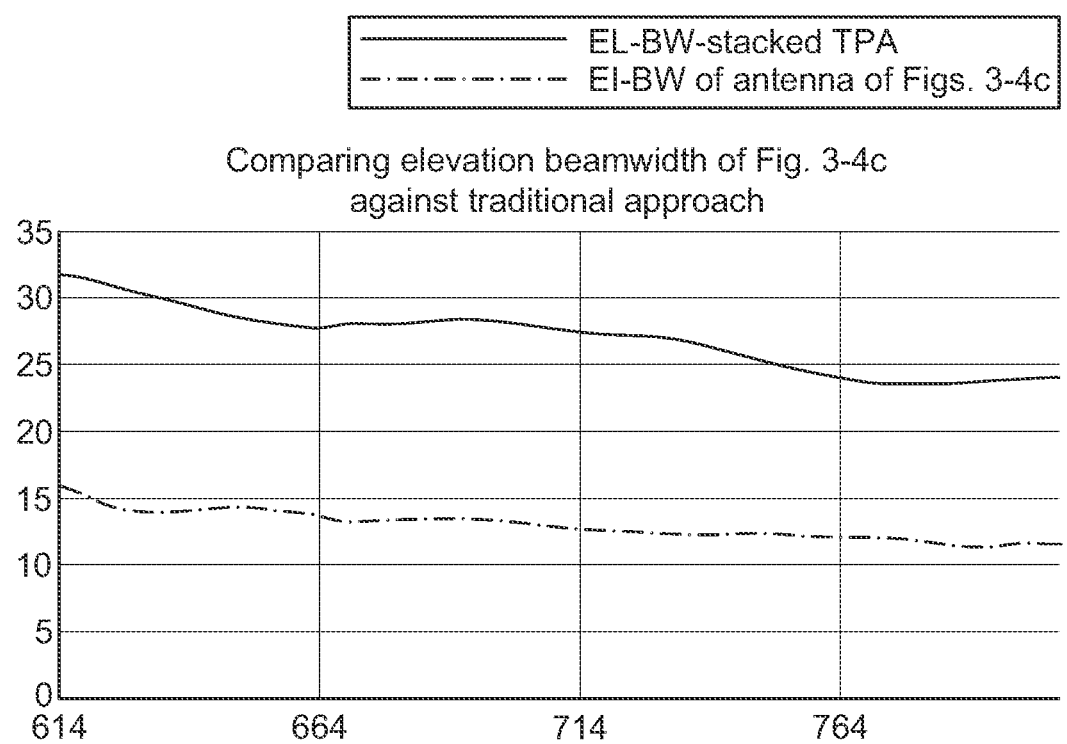
FIG. 6B shows a comparison of elevation beamwidth between the antenna of FIGS. 3-4C compared to the prior art stacked arrangement of FIG. 1.

FIG. 6B illustrates a comparison of elevation beamwidth shows that antenna 10/10a achieves an elevation beamwidth of about 15°-12° (narrow) over the low band frequency range whereas the stacked arrangement of prior art FIG. 1 achieves only 32°-23° (broader) over the same frequency range. This shows elevation beamwidth of the antenna is about half of stacked architecture and therefore the present arrangement reduces he interference of arrays A1 and A2 with other sectors.

In view of the above, the present locked array architecture dual polarized 45° MIMO antenna 10/10a is able to achieve a physically narrower width than the prior art side by side prior art arrangement of FIG. 2, but with substantially similar electrical signal quality using only three columns (for two arrays). Additionally, antenna 10/10a using a combination of interoperating column arrays A1 and A2 (with wide spacing) can achieve a 45° beamwidth for each array with narrow elevation beamwidth unlike a low gain stacked arrangement as shown in FIG. 1 (that uses two stacked 3-foot arrays). Moreover, antenna 10/10a can be implemented within a standard vertical length of about 6 feet. As such, this architecture is able to provide two 45° arrays A1 and A2 for 614-896 MHz in a narrow width of less than, for example, 535 mm (or with only three vertical columns instead of four), and within a standard height of about 6 ft, with more relative gain, and narrower relative elevation beamwidth that prior art attempts to overcome such issues (i.e. using stacked shorter arrays). Application of same concept for other frequency bands and heights is possible and will result in smaller width for the antenna for two full lengths array under one radome.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A cellular base station antenna comprising:
    a first and second array of a plurality of antenna elements arranged on a reflector, said first array of antenna elements including at least some of said plurality of antenna elements operating together to produce a first antenna beam; and
    said second array of antenna elements including at least some other of said plurality of antenna elements operating together to produce a second antenna beam,
    wherein said first array of antenna elements and said second array of antenna elements are arranged across three vertically arranged columns, and
    wherein each of said three vertically arranged columns include at least some elements from both said first array and said second array,
    wherein said antenna elements of the first array are located at a top half of an outside two columns of said three columns, and wherein said antenna elements of the first array are also located at a bottom half of a center column of said three columns.

2. The cellular base station antenna as claimed in claim 1, wherein said first and second arrays of antenna elements are dual polarized dipole elements, configured to operate at low-band frequencies.

3. The cellular base station antenna as claimed in claim 2, wherein said first and second arrays of antenna elements are dual polarized dipole elements, configured to operate at frequencies as low as 614 MHz.

4. The cellular base station antenna as claimed in claim 1, wherein each of said three vertically arranged columns include an equal number of elements from both said first array and said second array.

5. The cellular base station antenna as claimed in claim 1, wherein said antenna elements of the second array are located at said bottom half of an outside two columns of said three columns, and wherein said antenna elements of the second array are also located at said top half of said center column of said three columns.

6. The cellular base station antenna as claimed in claim 5, wherein elements of said first array located at said top of said outside two columns of said three columns produce a narrow beam of approximately 30° generating part of a first portion of said first antenna beam.

7. The cellular base station antenna as claimed in claim 6, wherein elements of said first array located at said bottom of said inside column of said three columns produce a wide beam of approximately 65° generating part of a second portion of first antenna beam.

8. The cellular base station antenna as claimed in claim 7, wherein said narrow beam of approximately 30° generating said first portion of said first antenna beam, and said wide beam of approximately 65° generating said second portion of said first antenna beam, combine in space to form said first antenna beam from said first array at approximately 45° beamwidth.

9. The cellular base station antenna as claimed in claim 8, wherein elements of said second array located at said bottom of said outside two columns of said three columns produce a narrow beam of approximately 30° generating a first part of said second antenna beam.

10. The cellular base station antenna as claimed in claim 9, wherein elements of said second array located at said top of said inside column of said three columns produce a wide beam of approximately 65° generating a second part of said second antenna beam.

11. The cellular base station antenna as claimed in claim 10, wherein said narrow beam of approximately 30° generating said first part of said second antenna beam, and said wide beam of approximately 65° generating said second part of said second antenna beam, combine to form said second antenna beam from said second array at approximately 45° beamwidth.

12. The cellular base station antenna as claimed in claim 1, wherein said first antenna beam is produced from a first two ports of said antenna (+45°/−45°), and wherein said second antenna beam is produced from a second two ports of said antenna (+45°/−45°), said antenna being configured for 4×4 MIMO applications.

13. The cellular base station antenna as claimed in claim 1, wherein said antenna has a plurality of phase shifters connected to said first and second arrays of antenna elements between ports located on said reflector and said antenna elements of said first and second arrays.

14. The cellular base station antenna as claimed in claim 13, wherein said antenna has a plurality of elevation splitters between said phase shifters and said radiating elements, configured to provide elevation signal splitting between vertically separated antenna elements within said first and second arrays.

15. The cellular base station antenna as claimed in claim 13, wherein said antenna has a plurality of azimuth splitters between said phase shifters and said radiating elements, configured to provide azimuth signal splitting between horizontally separated antenna elements within said first and second arrays.

* * * * *